United States Patent
Oba

(10) Patent No.: US 9,180,741 B2
(45) Date of Patent: Nov. 10, 2015

(54) PNEUMATIC TIRE

(75) Inventor: Ryo Oba, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 269 days.

(21) Appl. No.: 13/822,198

(22) PCT Filed: Oct. 3, 2011

(86) PCT No.: PCT/JP2011/072778
§ 371 (c)(1),
(2), (4) Date: Mar. 11, 2013

(87) PCT Pub. No.: WO2012/050000
PCT Pub. Date: Apr. 19, 2012

(65) Prior Publication Data
US 2013/0160914 A1 Jun. 27, 2013

(30) Foreign Application Priority Data

Oct. 15, 2010 (JP) .................................. 2010-232835

(51) Int. Cl.
*B60C 9/22* (2006.01)
*B60C 19/00* (2006.01)
*B60C 9/18* (2006.01)
*B60C 9/28* (2006.01)

(52) U.S. Cl.
CPC . *B60C 19/00* (2013.01); *B60C 9/18* (2013.01); *B60C 9/22* (2013.01); *B60C 9/2204* (2013.04); *B60C 19/002* (2013.04); *B60C 9/28* (2013.01); *B60C 2009/2219* (2013.04); *Y10T 152/10765* (2015.01)

(58) Field of Classification Search
CPC ...... B60C 9/22; B60C 9/2204; B60C 19/002; B60C 2009/2219
See application file for complete search history.

(56) References Cited

U.S. PATENT DOCUMENTS

| | | |
|---|---|---|
| 2007/0012394 A1 | 1/2007 | Kanehira |
| 2007/0131328 A1 | 6/2007 | Yukawa |

(Continued)

FOREIGN PATENT DOCUMENTS

| | | | |
|---|---|---|---|
| JP | H06-055913 | * | 3/1994 |
| JP | 2006-264667 A | | 10/2006 |

(Continued)

OTHER PUBLICATIONS

English machine translation of JPH06-055913, dated Mar. 1994.*

(Continued)

*Primary Examiner* — Justin Fischer
*Assistant Examiner* — Robert Dye
(74) *Attorney, Agent, or Firm* — Birch, Stewart, Kolasch & Birch, LLP

(57) ABSTRACT

A pneumatic tire comprises a belt layer 7, a band layer 9, and a noise damper 10 made of a sponge material and attached to a radially inner surface TS of a tread 2. The width WA of the noise damper 10 is of from 40%-70% of a ground contacting width TW of the tread. The band layer 9 has an overlapping portion 12 in which two band plies 9A, 9B are radially overlapped; and the overlapping portion 12 covers an axially outer region of the belt layer 7 with a cover width WB of from 10%-25% the ground contacting width TW. An axially inner end 12i of the overlapping portion 12 is spaced a distance LC of from 5%-20% the ground contacting width TW from an axially outer end E of the noise damper 10.

2 Claims, 5 Drawing Sheets

(56) References Cited

U.S. PATENT DOCUMENTS

2008/0135152 A1* 6/2008 Nakajima .................... 152/458
2009/0038726 A1   2/2009 Yukawa

FOREIGN PATENT DOCUMENTS

| JP | 2006-306302 A | 11/2006 |
| JP | 2007-161069 A | 6/2007 |
| JP | 2008-279841 | * 11/2008 |
| JP | 2010-173573 A | 8/2010 |

OTHER PUBLICATIONS

English machine translation of JP2008-279841, dated Nov. 2008.*
International Search Report for PCT/JP2011/072778 mailed on Dec. 27, 2011.

* cited by examiner

PNEUMATIC TIRE

TECHNICAL FIELD

The present invention relates to a pneumatic tire having comprehensively improved shoulder wear resistance, vehicle exterior noise, and high-speed durability.

BACKGROUND OF THE INVENTION

A pneumatic tire having high-speed durability shown in FIG. 5 is well known, for example. Such a pneumatic tire comprises a belt layer (B) and a band layer (A) disposed radially outside the belt layer (B) and including a band ply (a) formed of a spirally wound organic fiber band cord such as nylon cord and the like. The band layer (A) covers at least an axially outer end B1 of the belt layer (B). FIG. 5 shows the band layer (A) which covers the entire width of the belt layer B. This band layer (A) may prevent a lifting of the belt layer (B) caused by a centrifugal force while the tire is high speed traveling, especially may prevent the lifting at the axially outer end B1 which is a free end. Therefore, this pneumatic tire may reduce strain and heat generation in a tread shoulder portion Ys and may improve high-speed durability.

Moreover, the pneumatic tire may have high circumferentially rigidity in the tread portion due to binding force of the band layer (A). Therefore, this pneumatic tire has an effect of enhancing vibration characteristics.

In recent years, a pneumatic tire which includes a band layer formed of two band plies is proposed. Such a tire may improve vehicle exterior noise such as a pattern noise in addition to the high-speed durability due to high binding force of the band layer.

In order to reduce an internal vehicle noise such as a road noise, Patent documents 1 and 2 propose a pneumatic tire having a circumferentially extending belt-like noise damper made of a sponge material attached to a radially inner surface of a tread portion thereof, for example. This noise damper absorbs a resonance sound energy of columnar resonance generated in a tire cavity and inhibits the columnar resonance causing the road noise so as to reduce the internal vehicle noise.

However, as the result of research, the inventor of the present invention noticed a new problem that the shoulder wear resistance of the tread portion, vehicle exterior noise, or high-speed durability deteriorates when such a noise damper was used for the tire with the band layer (A) of two band plies.

RELATED ART

Patent Documents

Patent document 1: Japanese Unexamined Patent Application Publication No. 2006-306302.
Patent document 2: Japanese Unexamined Patent Application Publication No. 2007-161069.

GENERAL DESCRIPTION OF THE INVENTION

Problems to be Solved by the Invention

The present invention is on a basis of limiting a cover width of overlapping portion, where the two band plies are overlapped each other on an axially outer region of the belt layer; a noise damper width; and a distance between an axially inner end of the overlapping portion and an axially outer end E of the noise damper. It is therefore an object of the present invention to provide a pneumatic tire formed by inhibiting deterioration of the shoulder wear resistance, the vehicle exterior noise, or the high-speed durability caused by a combination of the noise damper with the band layer, and improve them comprehensively.

Means for Solving the Problem

To solve these problems, a pneumatic tire according to the present invention comprises a carcass extending from a tread portion through a sidewall portion to a bead core of a bead portion, a belt layer disposed radially outside of the carcass in the tread portion, a band layer disposed radially outside of the belt layer, and a belt-like noise damper attached to a radially inner surface of the tread portion and made of a sponge material extending in the tire circumferential direction. An axial width WA of the noise damper is in a range of from 40% to 70% of a ground contacting width TW of the tread portion. The band layer comprises two band plies made of organic fiber band cord spirally wound at an angle of not more than 10 degrees with respect to the tire circumferential direction, wherein the band layer includes an overlapping portion in which the two band plies are radially overlapped each other. The overlapping portion covers an axially outer region of the belt layer with a cover width WB in a range of from 10% to 25% of the ground contacting width TW of the tread portion. The overlapping portion has an axially outer end disposed in the same position or axially outwardly of an axially outer end F of the belt layer. The overlapping portion has an axially inner end spaced an axial distance LC apart from an axially outer end E of the noise damper, wherein the distance LC is set in a range of from 5% to 20% of the ground contacting width TW of the tread portion.

In order to reduce a vehicle exterior noise by increasing a binding force of the band layer, the overlapping portion where the two band plies are radially overlapped each other preferably has a wide cover width WB for covering the axially outer region of the belt layer. In order to reduce the internal vehicle noise by preventing columnar resonance, the noise damper preferably has a wide axial width WA.

However, when the cover width WB is wide and/or when the axial width WA of the noise damper is wide, the overlapping portion and the noise damper are radially overlapped each other, or the distance LC between the axially inner end of the overlapping portion and the axially outer end E of the noise damper is small. As the result of study, the inventor of the present invention found that the high-speed durability of the tire tended to deteriorate due to a damage at the axially inner end of the overlapping portion which is caused by a heat generated in the noise damper, when the overlapping portion and the noise damper were radially overlapped or when the distance LC between the axially inner end of the overlapping portion and the outer end of the noise damper was too small.

Therefore, to maintain the distance LC sufficiently is important in view of the high-speed durability. For that purpose, to reduce the cover width WB and/or the axial width WA of the noise damper is necessary. However, when cover width WB is too small, for example, the binding force of the band layer decreases, thereby causing deteriorating the vehicle exterior noise property and the high-speed durability. Moreover, since the tread crown portion tends to protrude radially outwardly due to a large width between a pair of overlapping portions, the ground contact pressure of the tread shoulder portion decreases relatively compared to the tread crown portion. In consequence, since the tread shoulder portion is slippery on the ground while traveling, the shoulder wear tends to generate on the other hand, when the axial width WA of the noise damper is too small, the advantage to prevent the columnar resonance by the noise damper may not be obtained.

The tire of the present invention has the necessity minimum cover width WB and axial width WA of the noise damper so that the suitable distance LC between the axially inner end of the overlapping portion and the outer end of the noise damper is maintained. This allows improving comprehensively the shoulder wear resistance, the vehicle exterior noise property, and the high-speed durability in a good balance while preventing the in-car noise such as road noise.

Incidentally, the belt layer is preferably formed of two belt plies made of steel cords inclined at an angle of from 20 to 30 degrees with respect to the tire circumferential direction. The belt cord arranged in one of the belt plies preferably inclines in the opposite direction to the belt cord arranged in the other belt ply.

EXPLANATION OF THE REFERENCE

Figure 1:
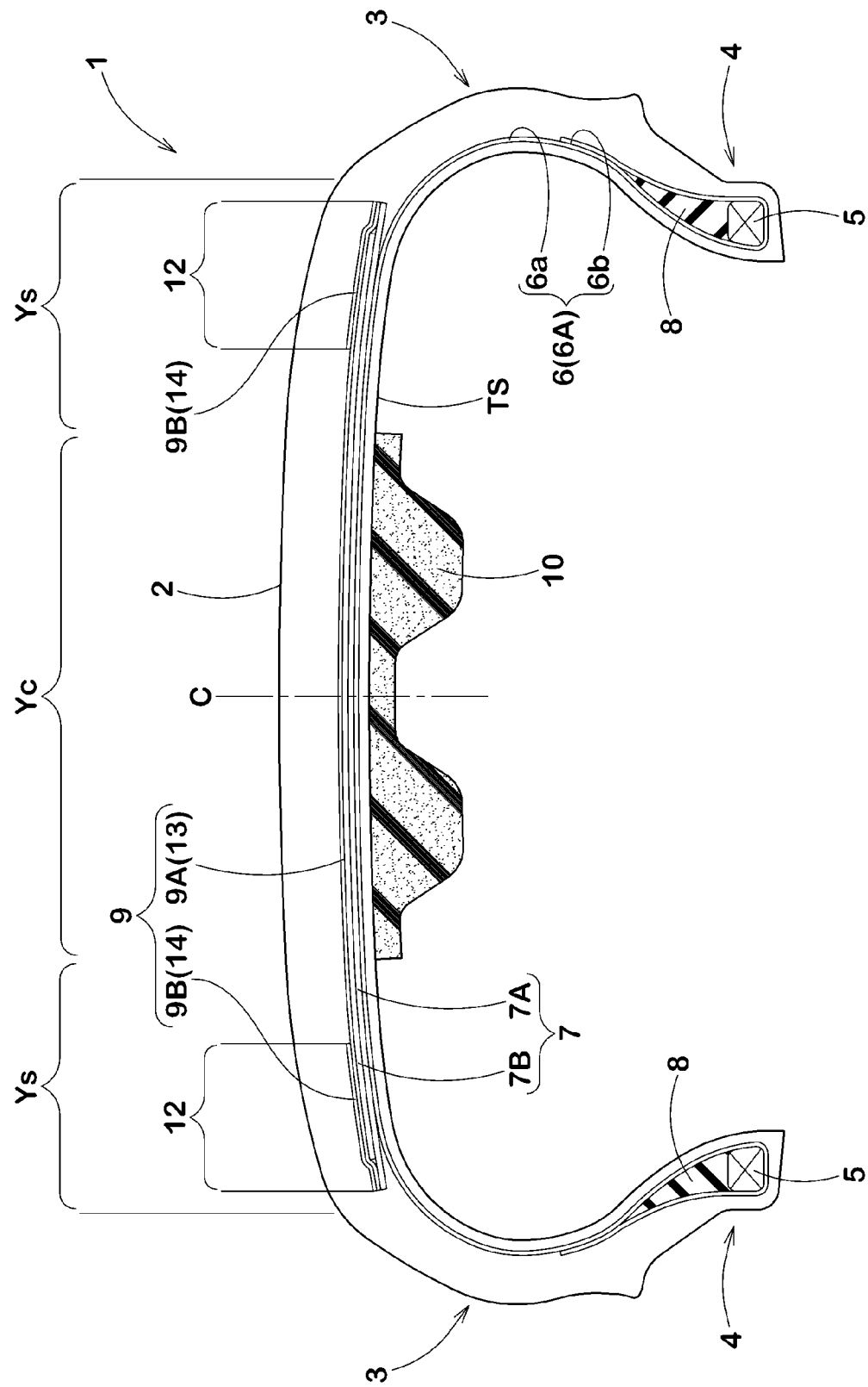
FIG. 1 is a tire meridian sectional view of a pneumatic tire of the present invention showing an embodiment.

1 Pneumatic tire
2 Tread portion
3 sidewall portion
4 Bead portion
5 Bead core
6 Carcass
7 Belt layer
7A, 7B Belt plies
8 Band layer
9A, 9B Band plies
10 Noise damper
12 overlapping portion
TS Radially inner surface of tread portion

BEST MODE FOR CARRYING OUT THE INVENTION

Hereinafter, an embodiment of the present invention will be described with referent to the drawings.

As shown in FIG. 1, a pneumatic tire 1 according to the present embodiment comprises a carcass 6 extending from a tread portion 2 through a sidewall portion 3 to a bead core 5 of a bead portion 4, a belt layer 7 disposed radially outside of the carcass 6 in the tread portion 2, a band layer 9 disposed radially outward of the belt layer 7, and a belt-like noise damper 10 attached to the radially inner surface TS of the tread portion 2 and made of a sponge material extending in the tire circumferential direction, at least.

The carcass 6 comprises at least one carcass ply 6A, a single carcass ply 6A in this embodiment, having a carcass cord inclining at an angle of from 75 to 90 degrees with respect to the tire circumferential direction, for example. This carcass ply 6A comprises a ply main portion 6a extending between the bead cores 5, 5 and a ply turned up portion 6b each turned up around the bead core 5 from the axial inside to the axial outside of the tire. A bead apex rubber 8 for bead reinforcement which extends and tapers radially outwardly of the tire from the bead core 5 is provided between the ply main portion 6a and the turned up portion 6b. In the present embodiment, as the carcass cord, a polyester cord is preferably employed, and an organic fiber cord such as nylon, rayon, aramid and the like, and also a steel cord as appropriate, may be employed.

The belt layer 7 comprises two belt plies 7A and 7B comprising steel belt cords inclined at an angle of from 20 to 30 degrees with respect to the circumferential direction of the tire. The belt plies 7A and 7B are superposed on one another with the respective belt cords inclining in different directions. In this belt layer 7, one of the belt cords intersects with the other so that the belt rigidity increases, and the substantially overall width of the tread portion 2 is reinforced. In the present embodiment, the belt ply 7A disposed radially inside of the tire has an axial width larger than that of the belt ply 7B disposed radially outside.

The band layer 9 comprises two band plies 9A and 9B each having a band cord made of an organic fiber, a nylon cord in this embodiment, spirally wound at an angle of preferably not more than 10 degrees with respect to the tire circumferential direction, more preferably not more than 5 degrees. The band layer 9 comprises an overlapping portion 12 where the two band plies 9A and 9B are radially overlapped each other so as to form two layers.

In the present embodiment, the radially inner band ply 9A is formed as a so-called full band ply 13, where the band ply superposes in the full width of the belt layer 7. The radially outer band ply 9B is formed as a so-called edge band ply 14, where the band ply superposes only the axially outer end portion of the belt layer 7, for example. However, the inner band ply 9A may be formed as the edge band ply 14, and the outer band ply 9B may be formed as the full band ply 13; and both of the band plies 9A and 9B may be formed as the edge band plies 14.

Figure 3:
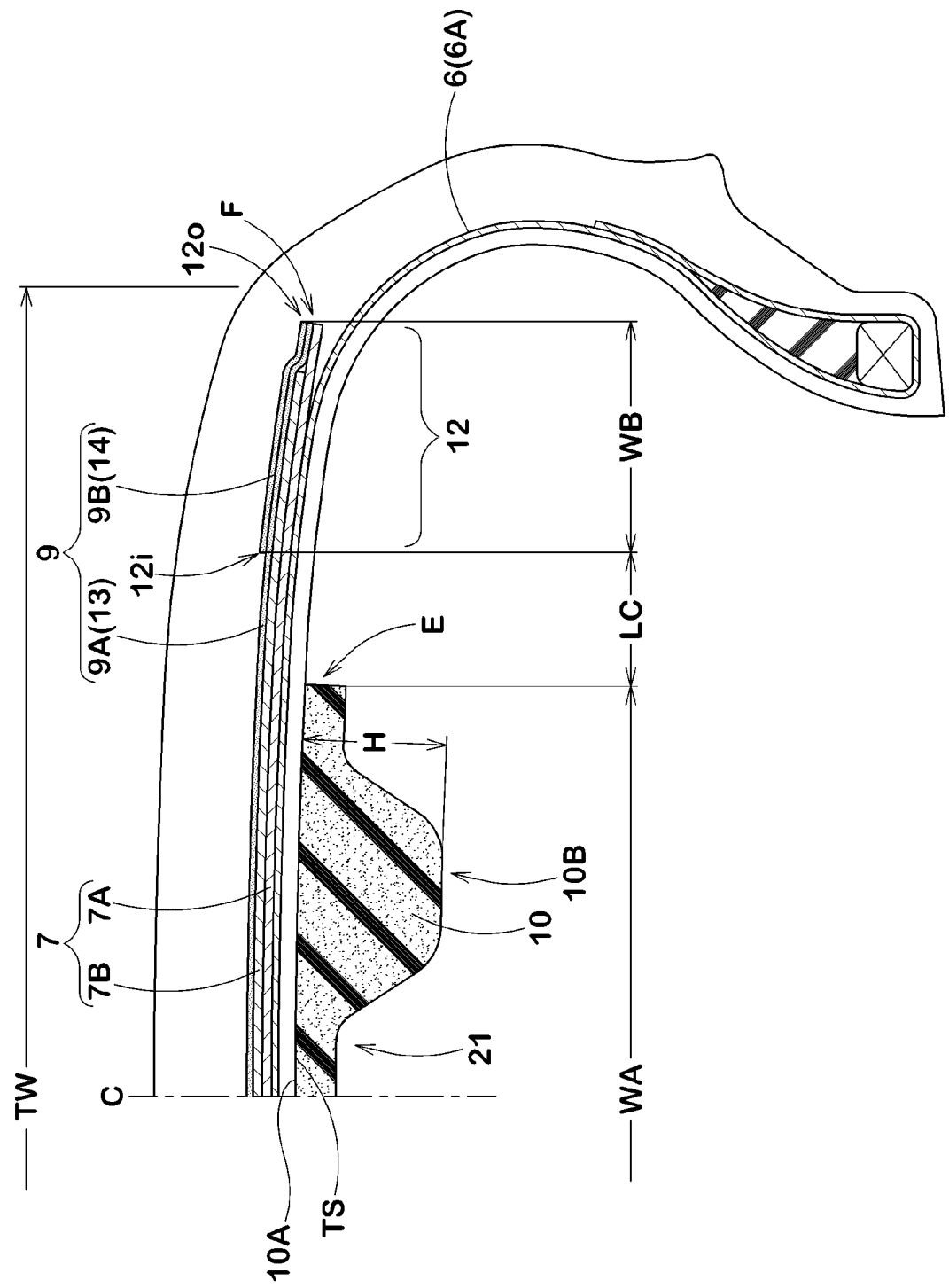
FIG. 3 is a partially exploded perspective view of the pneumatic tire.

In both of the cases, the overlapping portion 12 is disposed on axially outer region of the belt layer 7 with the cover width WB that is in a range of from 10% to 20% of the ground contacting width TW of the tread portion 2, as shown in FIG. 3.

An axially outer end 12o of the overlapping portion 12 is disposed in the same position of an axially outer end F of the belt layer 7 or more axially-outwardly than the axially outer end F of the belt layer 7. An axially inner end 12i of the overlapping portion 12 is spaced the distance LC apart from an axially outer end E of the noise damper 10 outwardly in the tire axial direction.

The noise damper 10 is formed of a sponge material. The sponge material has a cavernous porous structure that includes a so-called sponge comprising continuous bubbles made by foaming rubber or synthetic resin, additionally a web-like material made in combination with integrally connecting animal fiber, plant fiber, synthetic fiber or the like, for example. The above-mentioned "porous structure" comprises sponges having not only continuous bubbles but also independent bubbles. As the noise damper 10 in the present embodiment, a sponge material made of polyurethane having continuous bubbles is preferably employed.

In such as sponge material, a porous portion on its surface or inside portion changes vibrational energy of the air into heat energy and expends the energy. This decreases a sound (columnar resonance energy) and reduces the road noise. And, the sponge material is easily deformed, shrunk and curved, and it does not have a substantial effect on the tire deformation while traveling. Therefore, it can prevent from deterioration in the steering stability since the sponge material has a very small specific gravity, the deterioration of the tire weight balance is prevented.

An example of the sponge material is preferably a synthetic resin sponge such as ether-based polyurethane sponge, ester polyurethane sponge, polyethylene sponge and the like, and a rubber sponge such as chloroprene rubber sponge (CR sponge), ethylene-propylene rubber sponge (EDPM sponge), nitrile rubber sponge (NBR sponge) and the like. Especially, a polyurethane sponge or a polyethylene sponge comprising an ether-based polyurethane sponge is preferably from a standpoint of noise suppressing performance, lightweight properties, capability of adjustment to foaming, durability and the like.

Figure 2:
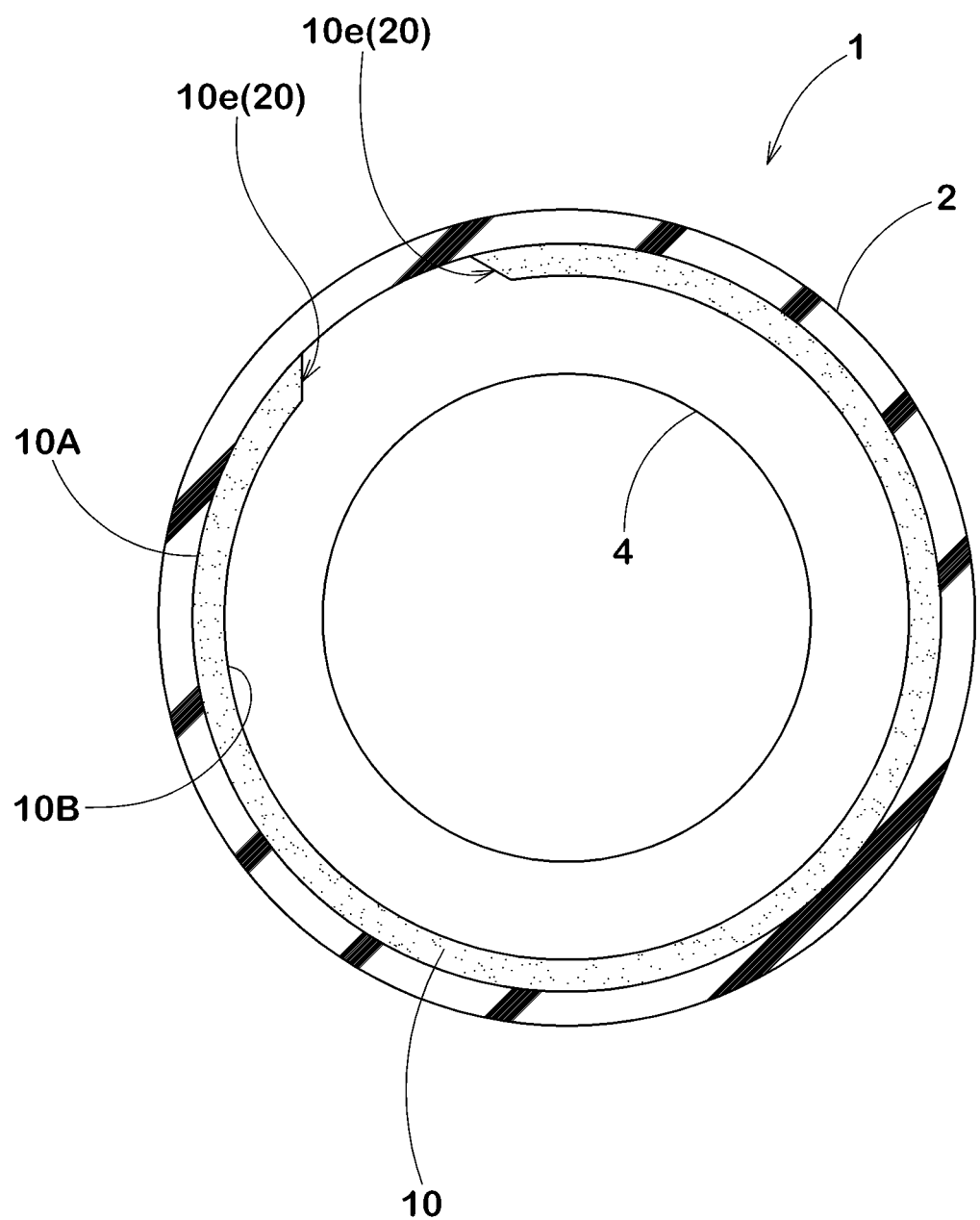
FIG. 2 is a circumferentially cross-sectional view of the pneumatic tire along the tire equator showing an embodiment.

The noise damper 10 has a bottom 10A fixed on the radially inner surface TS of the tread portion 2 as shown in FIG. 2, and extends in the tire circumferential direction. Additionally, the noise damper 10 may be shaped a substantially ring form in which circumferential outer ends 10e and 10e thereof are butt jointed each other or the circumferential outer ends 10e and 10e thereof may be apart in the circumferential direction as shown in FIG. 2. In the latter case, the circumferential outer end 10e is preferably formed as a taper portion 20 having a thickness (height) gradually decreasing toward the tire circumferential end to prevent crack damage of sponge material starting from the outer end 10e.

The noise damper 10 has substantially the same cross sectional shape at each position in the circumferential direction except the outer end 10e. This cross sectional shape preferably has a flat horizontally long shape having a smaller height H than the axial width WA to prevent falling and deformation while traveling. In particular, the noise damper 10 is preferably provided on the radially inner surface 10B with a groove 21 extending continuously in the circumferential direction as shown in this embodiment. The groove 21 may increase a surface area of the noise damper 10 so that more resonance energy is absorbed. Moreover, since the groove 21 may improve radiation performance of the noise damper 10, the increase in temperature of the sponge material is prevented.

In the present invention, the axial width WA of the noise damper 10 is set in a range of from 40% to 70% of the ground contacting width TW, the cover width WB of the belt layer 7 of the overlapping portion 12 is set in a range of from 10% to 25% of the ground contacting width TW, and the tire axial distance LC between the axially inner end 12i of the overlapping portion 12 and the axially outer end E of the noise damper 10 is set in a range of from 5% to 20% of the ground contacting width TW.

The ground contact width TW is defined as an axial width of the tread ground contact area obtained when the tire is mounted on a standard rim and inflated to a standard internal pressure and loaded with a standard tire load. The "standard rim" means a rim officially approved for each tire by a standard including one on which the tire is based. The standard rim is a "standard rim" in the case of JATMA, a "Design Rim" in the case of TRA, and a "Measuring Rim" in the case of ETRTO. The "standard internal pressure" means an air pressure officially approved for each tire by the standard. The "standard internal pressure" means a maximum air pressure in JATMA, a maximum value described in a table "TIRE LOAD LIMITS AT VARIOUS COLD INFLATION PRESSURES" in the case of TRA, and "INFLATION PRESSURE" in the case of ETRTO. When the tire is for a passenger car, the standard internal pressure is 180 KPa. The "standard tire load" means a load officially approved for each tire by the standard. The standard tire load is maximum load ability in the case of JATMA, a maximum value described in a Table "TIRE LOAD LIMITS AT VARIOUS COLD INFLATION PRESSURES" in the case of TRA, and a "LOAD CAPACITY" in the case of ETRTO.

In order to reduce a vehicle exterior noise by increasing a binding force of the band layer 9, the overlapping portion 12 preferably has a wide cover width WB for covering the axially outer region of the belt layer 7. In order to reduce the internal vehicle noise by preventing columnar resonance, the noise damper 10 preferably has a wide axial width WA.

However, when the cover width WB is large and/or when the axial width WA of the noise damper 10 is large, the overlapping portion 12 and the noise damper 10 are radially overlapped each other, or the distance LC between the axially inner end 12i of the overlapping portion 12 and the axially outer end E of the noise damper 10 is small. In these cases, the high-speed durability of the tire tended to deteriorate due to a damage at the axially inner end 12i of the overlapping portion 12 which is caused by a heat generated in the noise damper 10. From the standpoint of the high-speed durability, it is important to keep the distance LC sufficiently.

For that purpose, the cover width WB and/or the axial width WA of the noise damper are required for reduction. For example, when the cover width WB is too small, the binding force of the band layer 9 decreases, and the vehicle exterior noise property and the high-speed durability possibly decrease. Moreover, since the tread crown portion tends to protrude radially outwardly due to a large width between a pair of overlapping portions 12, 12, the ground contact pressure of the tread shoulder portion decreases relatively compared to the tread crown portion. In consequence, since the tread shoulder portion is slippery on the ground while traveling, the shoulder wear tends to generate. On the other hand, when the axial width WA of the noise damper is too small, the advantage to prevent the columnar resonance by the noise damper 10 may not be obtained.

The tire of the present invention has the necessity minimum cover width WB and axial width WA of the noise damper 10 so that the suitable distance LC between is maintained. This allows improving comprehensively the shoulder wear resistance, the vehicle exterior noise property, and the high-speed durability in a good balance while preventing the in-car noise such as road noise.

When the cover width WB is less than 10% of the ground contact width TW, the vehicle exterior noise property and the high-speed durability decrease due to low binding force of the band layer 9, and the shoulder wear is easy to arise. When the cover width WB is more than 25% of the ground contact width TW, it is difficult to maintain the distance LC with limit of not less than 5% of the ground contact width TW.

When the axial width WA of the noise damper 10 is less than 40% of the ground contact width TW, the advantage to prevent the columnar resonance by the noise damper 10 may not be obtained sufficiently. When the axial width WA is more than 70% of the ground contact width TW, it is difficult to maintain the distance LC with limits of not less than 5% of the ground contact width TW.

When the distance LC is less than 5% of the ground contact width TW, the overlapping portion 12 is affected by the influence of the heat of the noise damper 10 as mentioned above, and the high-speed durability deteriorates. When the distance LC is more than 20% of the ground contact width TW, it is difficult to set the cover width WB of not less than 10% with limits of the ground contact width TW or to set the axial width WA of the noise damper 10 with limits of not less than 40% of the tread ground contact width TW; therefore, it decreases any one of the vehicle exterior noise property, the high-speed durability, the shoulder wear resistance, and the in-car noise property.

Based on this standpoint, the lower limit of the cover width WB is preferably not less than 12.5% of the ground contact width TW, and the upper limit is preferably not more than 20%, more preferably not more than 17.5% of the ground contact width TW.

The lower limit of the axial width WA of the noise damper 10 is preferably not less than 45% of the ground contact width TW, the upper limit is not more than 60%, more preferably not more than 55% of the ground contact width TW.

The lower limit of the distance LC is preferably not less than 7.5% of the ground contact width TW, and the upper limit is not more than 15%, more preferably not more than 12.5% of the ground contact width TW.

Although the especially preferred embodiments of the present invention have been described in detail, needless to say, the invention is not limited to the above-mentioned concrete embodiments, and various modifications can be made.

EXAMPLE

To ensure effects of the Invention, pneumatic tires with noise dampers each having an internal structure shown in FIG. 1 (tire size: 195/65R15) were made on the basis of the specification shown in Table 1. Then, tires were tested on vehicle exterior noise property, high-speed durability, shoulder wear resistance, and in-car noise property. The test results were indicated on five-point scale.

Figure 4:
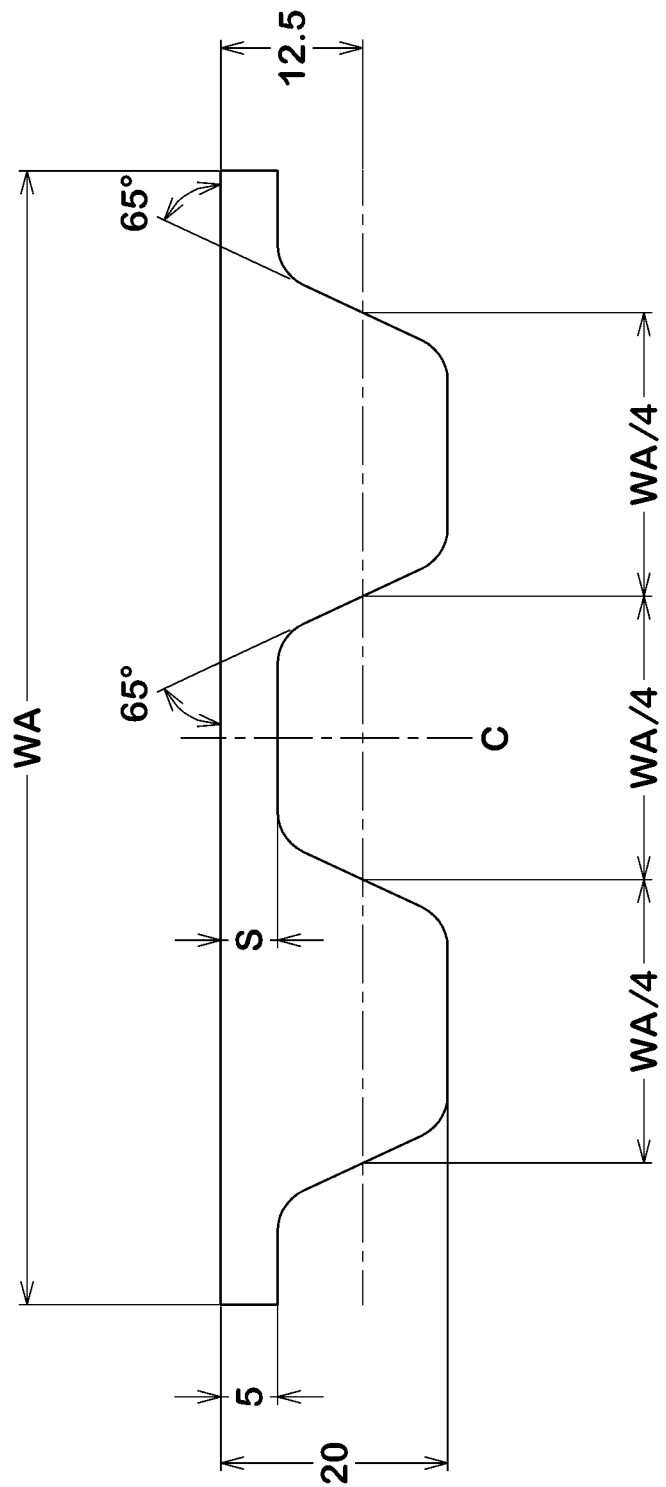
FIG. 4 is a cross-sectional view of a noise damper used in Table 1.

Common specifications of pneumatic tires were as follows:
Carcass:
  Ply number: two plies
  Cord: 1100 dtex/2 (PET)
  Cord angle: +88 degrees/−88 degrees
  Cord count: 50 cords/5 cm
Belt Layer:
  Belt width: 156 mm
  Ply number: two plies
  Belt cord: steel cord(s) (2+3×0.20)
  cord angle: +20 degrees/−20 degrees
  Cord count: 40 cords/5 cm
Band Layer:
  Band cord: nylon (2100 dtex/2)
  Cord count: 50 cords/5 cm Noise Damper:
  sponge material: ether-based polyurethane sponge (specific gravity: 0.039) (ESH2 manufactured by INOAC CORPORATION)
  Cross sectional shape: shown in FIG. 4
  Circumferential length: 1840 mm
  The noise damper was adhered with a double-side adhesive tape: ("E700" manufactured by EBISU CHEMICAL CO. LTD).

Test methods were as follows.
(1) Vehicle Exterior Noise Property:
  Each of the test tires was mounted on a rim (15×6 JJ) under an internal pressure (200 kPa) for all wheels of a FF passenger car of 2,000 cc displacement. The car coasted 50 meters on a straight test road at a transit speed of 53 km/h. Then, a maximum transit sound pressure level was measured at the midpoint of the test course with a fixed microphone located apart laterally from a running centerline of the car with a distance of 7.5 meters and at the level of 1.2 meters from the road surface. Evaluation was indicated on five-point scale with Traditional Example 1 being three-point. The larger the numeric value was, the more favorable it was.

(2) In-Car Noise Property:
  When the above-mentioned car ran on a road-noise measuring road (asphalt rough-surfaced road) at the speed of 60 km/h, the in-car noise was measured with a microphone located on a window side seat and near a driver's ear. The measured result of a sound pressure level was the peak value of the columnar resonance sound of about 240 Hz. Evaluation was indicated on five-point scale with Traditional Example 1 being three-point. The larger the numeric value was, the more favorable it was.

(3) High-Speed Durability:
  The tire was rolled on a drum running tester from the speed of 60 km/h, under an internal pressure (280 kPa) loaded under a condition of an internal pressure of 280 kPa and a load of 4.83 kN, and the speed increases by 10 km/h per 10 minutes. A running distance where damage arose in a tread portion was measured. Evaluation was indicated on five-point scale with Traditional Example 1 being three-point. The larger the numeric value was, the more favorable it was.

(4) Shoulder Wear Resistance:
  The car ran 25000 km on the tire test course, and a wear amount in the shoulder groove was measured. Evaluation was indicated on five-point scale with Traditional Example 1 being three-point. The larger the numeric value was, the more favorable it was. The test result is shown in Table 1.

TABLE 1-1

|  | Traditional Ex. | Ref. Ex. 1 | Ex. 1 | Ex. 2 | Ex. 3 | Ref. Ex. 2 | Ref. Ex. 3 | Ex. 4 |
|---|---|---|---|---|---|---|---|---|
| <Band layer> | | | | | | | | |
| Outer band ply (*1) | None | EB | EB | EB | EB | EB | EB | EB |
| Inner band ply (*1) | FB | FB | FB | FB | FB | FB | FB | FB |
| Cover width WB of overlapping portion (*2) | — | 8% | 10% | 15% | 20% | 30% | 5% | 10% |
| <Noise damper> | | | | | | | | |
| Cross sectional shape | FIG. 4 | FIG. 4 | FIG. 4 | FIG. 4 | FIG. 4 | FIG. 4 | FIG. 4 | FIG. 4 |
| Width WA (*2) | 50% | 50% | 50% | 50% | 50% | 50% | 70% | 70% |
| Distance LC between overlapping portion and noise damper (*2) | — | 17% | 15% | 10% | 5% | −5% | 10% | 5% |
| Vehicle exterior noise property | 3 | 3 | 4 | 4 | 5 | 5 | 2 | 4 |
| High-speed durability | 3 | 3 | 3 | 4 | 3 | 2 | 3 | 3 |
| Shoulder wear resistance | 3 | 2 | 4 | 4 | 5 | 5 | 2 | 4 |
| In-car noise performance | 3 | 5 | 5 | 5 | 5 | 5 | 5 | 5 |
| Comprehensive evaluation | 3 | 2 | 4 | 4 | 5 | 2 | 2 | 4 |

TABLE 1-1-continued

|  | Ref. Ex. 4 | Ref. Ex. 5 | Ex. 6 | Ex. 7 | Ex. 8 | Ex. 9 | Ref. Ex. 6 |
|---|---|---|---|---|---|---|---|
| <Band layer> | | | | | | | |
| Outer band ply (*1) | EB | EB | EB | EB | EB | EB | EB |
| Inner band ply (*1) | FB | FB | FB | FB | FB | FB | FB |
| Cover width WB of overlapping portion (*2) | 15% | 20% | 10% | 15% | 20% | 25% | 7.5% |
| <Noise damper> | | | | | | | |
| Cross sectional shape | FIG. 4 | FIG. 4 | FIG. 4 | FIG. 4 | FIG. 4 | FIG. 4 | FIG. 4 |
| Width WA (*2) | 70% | 70% | 40% | 40% | 40% | 40% | 75% |
| Distance LC between overlapping portion and noise damper (*2) | 0% | −5% | 20% | 15% | 10% | 5% | 5% |
| Vehicle exterior noise property | 4 | 5 | 4 | 5 | 5 | 5 | 2 |
| High-speed durability | 2 | 2 | 4 | 4 | 4 | 3 | 3 |
| Shoulder wear resistance | 4 | 4 | 4 | 5 | 5 | 5 | 2 |
| In-car noise performance | 5 | 5 | 4 | 4 | 4 | 4 | 5 |
| Comprehensive evaluation | 2 | 2 | 4 | 5 | 5 | 4 | 2 |

Figure 5:
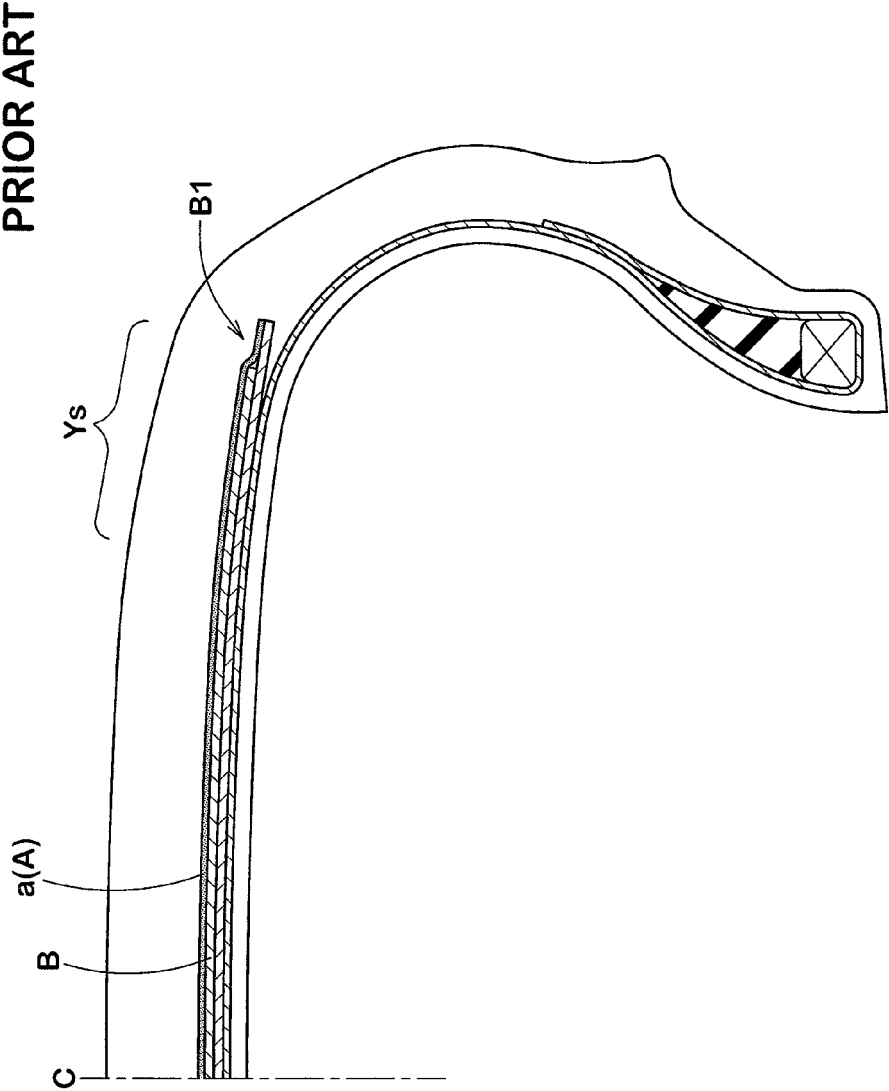
FIG. 5 is a tire meridian sectional view showing a traditional embodiment of a tire.

|  | Ref. Ex. 7 | Ref. Ex. 8 | Ref. Ex. 9 | Ref. Ex. 10 | Ref. Ex. 11 |
|---|---|---|---|---|---|
| <Band layer> | | | | | |
| Outer band ply (*1) | EB | EB | EB | EB | EB |
| Inner band ply (*1) | FB | FB | FB | FB | FB |
| Cover width WB of overlapping portion (*2) | 10% | 15% | 17.5% | 20% | 22.5% |
| <Noise damper> | | | | | |
| Cross sectional shape | FIG. 4 | FIG. 5 | FIG. 6 | FIG. 7 | FIG. 8 |
| Width WA (*2) | 35% | 35% | 35% | 35% | 35% |
| Distance LC between overlapping portion and noise damper (*2) | 22.5% | 17.5% | 15% | 12.5% | 10% |
| Vehicle exterior noise property | 3 | 4 | 5 | 5 | 5 |
| High-speed durability | 2 | 4 | 5 | 4 | 5 |
| Shoulder wear resistance | 3 | 4 | 5 | 5 | 5 |
| In-car noise performance | 2 | 2 | 2 | 2 | 2 |
| Comprehensive evaluation | 2 | 2 | 2 | 2 | 2 |

(*1) EB means an edge band ply; and FB means a full band ply.
(*2) A numerical value is indicated as value with respect to the ground contact width TW. The ground contact width TW is 146 mm. FB has the same width as the belt width (144 mm).

As shown in Table 1, it was confirmed that in the tires of Examples deterioration of shoulder wear, vehicle exterior noise, or the high-speed durability caused by a combination of the noise damper and the band layer could be suppressed; and they were overall improved.

The invention claimed is:

1. A pneumatic tire comprising
a carcass extending from a tread portion through a sidewall portion to a bead core of a bead portion,
a belt layer disposed radially outside of the carcass in the tread portion,
a belt-like noise damper attached to a radially inner surface of the tread portion and made of a sponge material extending in the tire circumferential direction, the noise damper having an axial width WA in a range of from 40% to 70% of a ground contacting width TW of the tread portion,
a band layer disposed radially outside of the belt layer, said band layer comprising two band plies made of organic fiber band cord spirally wound at an angle of not more than 10 degrees with respect to the tire circumferential direction, wherein the band layer includes an overlapping portion in which said two band plies are radially overlapped each other, and
said overlapping portion covering an axially outer region of the belt layer with a cover width WB in a range of from 20% to 25% of said ground contacting width TW of the tread portion, said overlapping portion having an axially outer end disposed in the same position or axially outwardly of an axially outer end F of the belt layer, said overlapping portion having an axially inner end spaced an axial distance LC apart from an axially outer end E of said noise damper, wherein the distance LC is set in a range of from 5% to 20% of said ground contacting width TW of the tread portion.

2. The pneumatic tire as set forth in claim 1,
wherein said belt layer comprises two belt plies each of which comprises steel cords inclined at an angle of from 20 to 30 degrees with respect to the circumferential direction of the tire, and
the belt plies are overlapped each other so that the respective belt cords incline in different directions.

* * * * *